Feb. 28, 1939.   F. W. FUNKE   2,149,119

FLUID SEAL FOR FIRE HOSE REELS

Filed Sept. 8, 1937

INVENTOR
F. W. Funke
BY
ATTORNEYS

Patented Feb. 28, 1939

2,149,119

UNITED STATES PATENT OFFICE 2,149,119

FLUID SEAL FOR FIRE HOSE REELS

Fred W. Funke, Oakland, Calif.; dedicated to the free use of the Public in the Territory of the United States of America Application September 8, 1937, Serial No. 162,876

3 Claims. (Cl. 285—9)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without payment to me of any royalty thereon.

I hereby dedicate the invention herein described to the free use of the Public in the territory of the United States of America, to take effect upon the granting of a patent to me.

This invention relates to fire-fighting equipment and is more particularly concerned with high-pressure seals adapted for use on the intake of fire hose reels.

An object of this invention is to provide a seal of the type mentioned to facilitate the loading or unloading of hose reels or other carriers while live water streams are passed through the hose line.

Another object of this invention is to provide such a device which combines in a novel way the features of the ordinary gland or stuffing box and the compensating type pressure reel hydraulic bearing.

Hydraulic pressure type glands or stuffing boxes require the application of mechanical pressure to the packing to produce a seal, the degree of initial mechanical pressure determining the effectiveness of the seal. This invention embodies the seal feature of the ordinary hydraulic pressure type gland or stuffing box in a manner which is automatic in operation.

The following specification, together with the accompanying drawing, will fully disclose my invention, and further objects and advantages thereof will be apparent.

Figure 1:
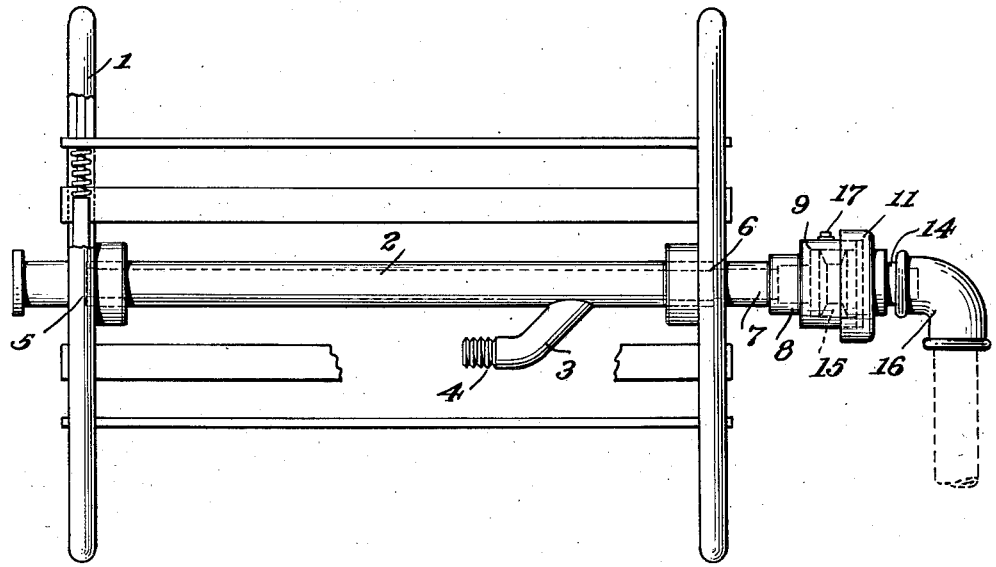
Figure 1 is a front plan view showing in assembly the hose reel and the disposition of the seal.
Figure 2:
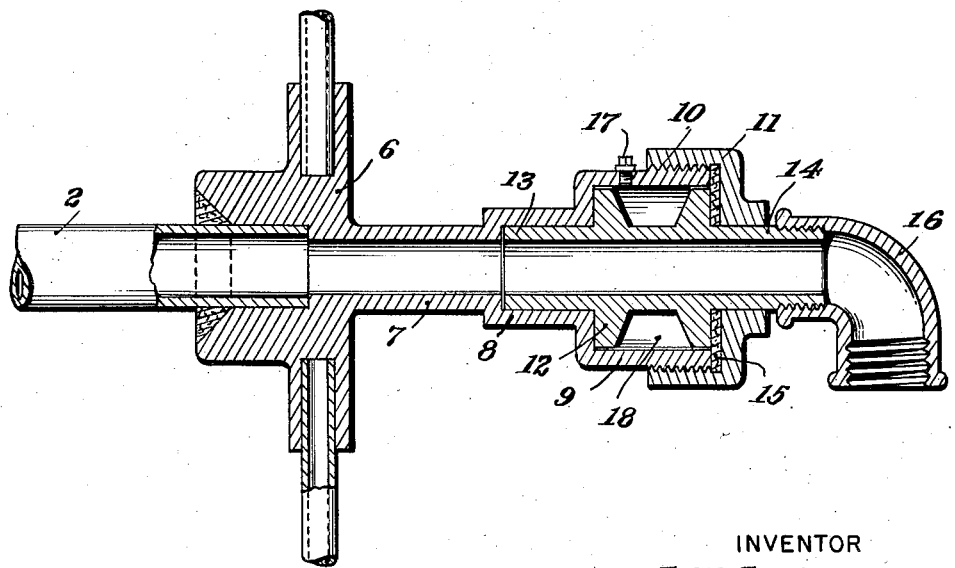
Figure 2 is an enlarged detailed cross-sectional view of the seal.

Referring with more particularity to the drawing, in which like numerals refer to like parts, the numeral 1 designates a hose reel having a hollow axis 2, provided with an elbow joint 3, terminating parallel to the axis 2, and having a threaded portion 4 adapted for receiving a hose connection. One end of said axis 2 is closed by being recessed in hub 5 and the other end of said axis 2 is recessed in hub 6, said last-mentioned hub having a hollow extended portion 7, carrying an enlarged section 8 and a further enlarged section 9. Said section 9 is provided with a threaded portion 10 adapted to receive the threaded cap 11. A hollow cylindrical spool 12, having reduced sections 13 and 14, is rotatably mounted co-axially with said members 7, 8, and 9, as shown in the drawing. A disc washer 15, of leather or other suitable composition, is disposed between the cap 11 and member 9, substantially as shown in the drawing. Member 14 extends an appreciable distance beyond the cap 11 and the exposed end is threaded to receive a pipe elbow fitting 16, through which a fluid may be introduced. A removable plug 17, or other suitable means, is provided in section 9 so that a lubricant may be inserted into the annular space 18.

Under no-load conditions, no pressure is exerted by the spool 12 against the washer 15. When water or other fluid is directed through the elbow 16, the hydraulic pressure created by the change in direction of fluid passing through the elbow forces the spool 12 to exert a pressure upon the washer 15, correspondingly proportionate to the head and velocity of the fluid. Thus the seal pressure automatically increases with an increase in load.

While the reel rotates, carrying with it its integral parts 8, 9, 10, and 11, the spool 12 and elbow 16 do not rotate by overcoming the friction between the said spool and washer.

It is to be understood that various changes may be resorted to within the scope of the appended claims without sacrificing any advantages of this invention or departing from the spirit thereof.

Having fully described this invention, I claim:

1. In a fire hose reel, a fluid seal comprising a housing, a removable cap constituting a wall of said housing, a longitudinally hollow spool rotatably mounted within said housing, said spool having one end within a recess in said housing and the other end extending exteriorly terminating with a threaded portion adapted to receive a pipe fitting, a packing washer radially secured between said cap and said housing in juxtaposition to said spool, a lubricating chamber between said housing and said spool, and a removable plug in said housing for inserting a lubricant within said chamber.

2. A fluid seal adapted for use on the intake of a fire hose reel, comprising a housing integral with said intake, a removable cap constituting one wall of said housing, said cap having a central bearing portion, a hollow spool rotatably mounted within said housing, said hollow portion communicating with the intake of said fire hose reel, an elbow pipe fitting secured to the exterior portion of said spool, and a packing washer secured between said cap and said housing in juxtaposition to said spool.

3. A fluid seal adapted for use on the hub intake of a fire hose reel consisting of a housing having a removable wall, a longitudinally hollow spool rotatably mounted in said housing communicating with the said hub intake, a packing washer secured between said housing and said removable wall in juxtaposition to said spool, said spool being designed to provide an annular lubrication chamber within said housing, means for introducing a lubricant within said housing, means for directing a fluid through the hollow portion of said spool, and means for automatically increasing the pressure of said spool against said washer with an increase of fluid pressure.

FRED W. FUNKE.